(No Model.)

O. FECHNER.
LOCKING DEVICE FOR SPRING SAFETY HOOKS.

No. 558,056.  Patented Apr. 14, 1896.

Witnesses:

Inventor:

UNITED STATES PATENT OFFICE.

OTTO FECHNER, OF GROSS-STRELITZ, GERMANY.

LOCKING DEVICE FOR SPRING SAFETY-HOOKS.

SPECIFICATION forming part of Letters Patent No. 558,056, dated April 14, 1896.

Application filed July 6, 1895. Serial No. 555,137. (No model.)

*To all whom it may concern:*

Be it known that I, OTTO FECHNER, watchmaker, residing at Gross-Strelitz, in the Province of Silesia, Prussia, German Empire, have invented new and useful Improvements in Locking Devices for Spring Safety-Hooks or the Like, of which the following is a specification.

Figure 1:
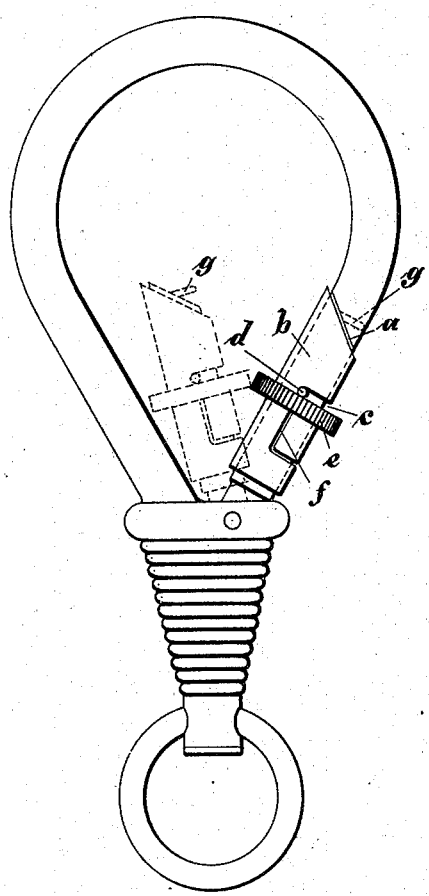
Figure 2:
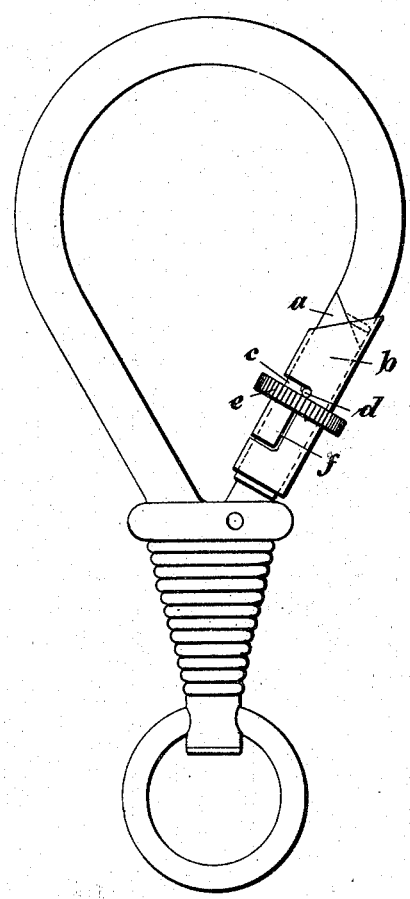

In the accompanying drawings, Figure 1 shows the locking device open, and Fig. 2 shows the locking device closed.

The invention consists of a new or improved locking device for spring safety-hooks or the like which when in operation prevents the tongue or pivoted arm from being moved and thus insures perfect safety.

Upon the movable arm $a$ or tongue of the safety-hook is mounted a turnable sleeve $b$, cut or beveled at its upper end to correspond with the angle of the meeting edges and provided with a notched ring or the like at any convenient part of its length to facilitate turning with the fingers. The sleeve is prevented from turning through more than a semicircle $e$ by means of a peg $d$ in the tongue engaging in a slot $c$ in the turnable sleeve $b$. Said sleeve $b$ is also provided with slots $f$, whereby spring-flaps are formed which when bent slightly inwardly bear against the tongue and by their friction prevent accidental turning of the sleeve.

It will be seen that on the hook being closed and the sleeve turned through half a revolution the latter will slightly overlap the junction of the hook and the tongue and thus effectually prevent the tongue from being pressed inward, but on being turned again it may be easily opened.

Having now described my invention, what I claim, and desire to secure by Letters Patent, is—

A locking device for spring safety-hooks, consisting of a turnable sleeve, mounted on a movable arm or tongue and cut or beveled at its upper end to correspond with the angle of the meeting edges, a notched ring, a peg in the tongue engaging in a slot in the turnable sleeve; said sleeve being also provided with slots whereby spring-flaps are formed for the purpose set forth.

In witness whereof I have hereunto signed my name in the presence of two subscribing witnesses.

OTTO FECHNER.

Witnesses:
 EWALD BÖEHM,
 ERNST KATZ.